R. H. GARMAN.
ILLUSTRATED BOOK.
APPLICATION FILED JULY 16, 1912.

1,089,922.

Patented Mar. 10, 1914.

UNITED STATES PATENT OFFICE.

RAYMOND H. GARMAN, OF CHICAGO, ILLINOIS.

ILLUSTRATED BOOK.

1,089,922. Specification of Letters Patent. Patented Mar. 10, 1914.

Application filed July 16, 1912. Serial No. 709,732.

*To all whom it may concern:*

Be it known that I, RAYMOND H. GARMAN, a citizen of the United States, residing at Chicago, in the county of Cook and State of Illinois, have invented certain new and useful Improvements in Illustrated Books, of which the following is a specification.

The present invention relates to that type of book containing pictures and other matter intended to appeal to children.

One of the objects of the present invention is to provide a series of leaves having lines of separation extending therethrough, thereby dividing said leaves into a plurality of sections, each of said sections, when superimposed upon the leaf next adjacent, producing a picture on the latter leaf of different effect from the picture printed on said leaf, whereby a plurality of different pictures can be obtained by the use of a comparatively small number of prints; and another object of the invention is to so arrange the lines of severance as to bring the illustrations on the various sections of the leaf into proper registry with the picture on the next adjacent leaf, thereby enabling the perspective of the pictures to be maintained when one of said sections is superimposed, and allowing of the usage of short and long figures in the picture, and at the same time have the illustrations of the sections register with the picture upon which it is superimposed.

The invention further consists in the features of construction and combination of parts hereinafter described and claimed.

Figure 1:
Figure 2:
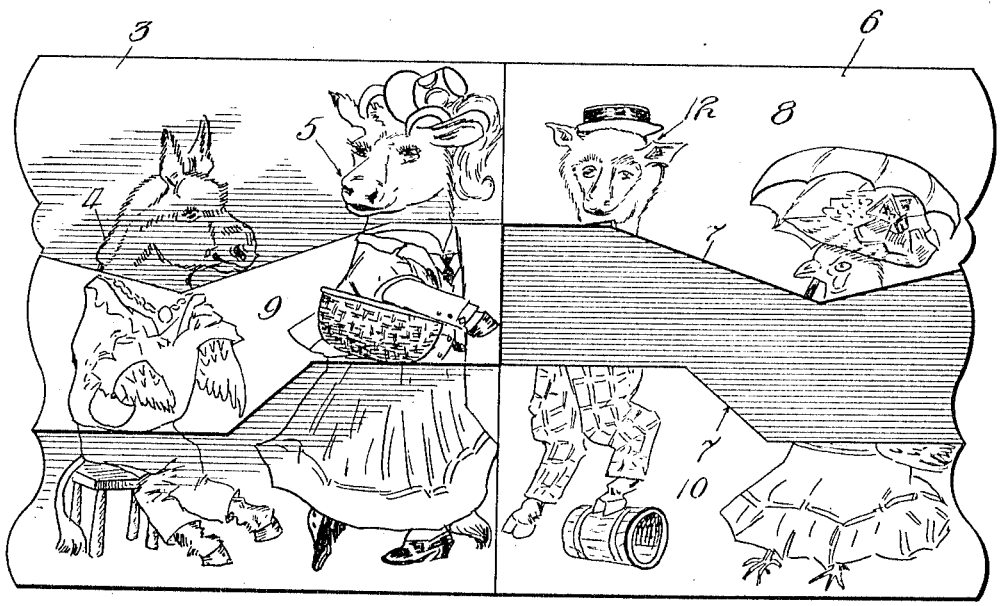

In the drawing, Figure 1 is an elevation of the book of the present invention in open position, and showing one leaf provided with lines of severance dividing it into sections, and the opposed leaf of an unbroken or continuous character; and Fig. 2 is a view similar to Fig. 1, showing one of the sections of the severed leaf superimposed on the continuous leaf.

In the art to which the present invention relates, difficulty has been experienced in making a proper registry of the figures when sections of one leaf are superimposed onto another, owing to the fact that all books of this nature, of which I am aware, are provided with a perfectly straight line of severance in the sectional leaf, with a result that the figures on the sections and on the unbroken leaves would fail to register, unless the various portions of the figure all lie in the same plane. This was a disadvantage, since it was impossible to employ a picture having any appreciable perspective or a picture, in which a short and long figure were combined, and arranged in different planes, thus limiting the subjects of the pictures to a relatively narrow field.

The present invention deals with a peculiar line of severance which enables a proper registration of the various sections with the picture next adjacent to be obtained, no matter what the style or arrangement of said picture may be.

Referring to the drawing, the book which I have illustrated comprising the best form of my invention, of which I am now aware, consists of a leaf 3 which is of an unbroken or continuous character; that is, it is not capable of having one part turned independently of the remainder, and remains as a unit at all times. Said leaf, as illustrated, contains two figures, one of which 4 is of a short nature, and the other of which 5 is of a larger nature, the two figures lying in different planes upon the leaf 3. The leaf 6 next adjacent to the leaf 3 is provided with a series of undulating lines of severance 7, cutting said leaf into an upper section 8, an intermediate section 9, and a lower section 10. This leaf contains a short figure 11 and a larger figure 12. By referring to the drawing, it will be noted that the heads of the figures on the leaf 6 are in the upper section 8, the trunks or bodies in the intermediate section 9, and the legs in the lower section 10. With the peculiar lines of severance employed, the head of one figure in the section 8 will lie in a different plane from that of the head of the other figure, so that, when this section is superimposed onto the leaf 3, the heads of the figures on said section 8 will register with the heads of the figures on the leaf 3, bringing the heads into proper position with respect to the figures on this latter leaf. In the illustration of the invention shown in the drawing, the peculiar line of severance is used in order to register parts of two figures of different heights, but obviously the same construction will allow the illustration of any selected section to register with another picture, in case said picture contained portions in different perspectives.

By the arrangement above described, a series of different pictures can be produced from a relatively small number of prints, and the different portions will always combine to produce an artistically correct picture.

In the form of book illustrated in the drawing, only each alternate leaf is of the severed character. This is a desirable construction, since the user will always turn the section of the leaf next adjacent to the continuous leaf, and always obtain a proper registration of the figures or landscape comprising the picture, the line of severance of each sectional leaf being arranged according to the perspective or arrangement of figures of the picture on the continuous leaf. The invention, however, is limited only in correspondence to the language of the intended claims.

I claim:

1. A book of the class described, comprising a plurality of illustrative pages, one of said pages being unbroken and the next adjacent page being divided into sections by lines of severance, an inwardly disposed and an outwardly disposed illustrative subject on each of said pages, one of said subjects lying in different positions with respect to the other as regards the top and bottom of the page on which they are positioned, said lines of severance extending irregularly across said divided page, whereby upper portions of the subjects on said divided page are all arranged in one said section thereof, the middle portions of said subjects in another section thereof, and the lower portions of said subjects on the lowermost section thereof, whereby a registration of that portion of the subjects on any selected section of the divided page will be made with respect to the corresponding portion of subjects on the unbroken page when said sections superimpose upon said unbroken page, and a different subject thus produced, substantially as described.

2. A book of the class described, comprising a plurality of illustrative pages, one of said pages being unbroken and the next adjacent page being divided into sections by lines of severance, an inwardly disposed and an outwardly disposed illustrative subject on each of said pages, one of said subjects lying in different positions with respect to the other as regards the top and bottom of the page on which they are positioned, the outwardly disposed subjects on adjacent pages being substantially alined, and the inwardly disposed subjects on the adjacent pages being substantially alined, said lines of severance extending irregularly across said divided page, whereby the upper portions of the subjects on said divided page are all arranged in one section thereof, the middle portions of said subjects in another section thereof, and the lower portions of said subjects on the lower portion thereof, whereby a registration of that portion of the subjects on any selected section of the divided page will be made with respect to the corresponding portion of the subjects on the unbroken page when said section is superimposed upon said unbroken page and a different subject produced, substantially as described.

RAYMOND H. GARMAN.

Witnesses:
Wm. P. Bond,
Frances M. Frost.

---

Copies of this patent may be obtained for five cents each, by addressing the "Commissioner of Patents, Washington, D. C."